Dec. 19, 1950 C. H. HOEPPNER 2,534,264

PULSE WIDTH DISCRIMINATOR

Filed Aug. 3, 1945 2 Sheets-Sheet 1

PULSE RECEIVING SYSTEM

Inventor
CONRAD H. HOEPPNER

By Ralph L Chappell

Attorney

Dec. 19, 1950 C. H. HOEPPNER 2,534,264

PULSE WIDTH DISCRIMINATOR

Filed Aug. 3, 1945 2 Sheets-Sheet 2

Inventor
CONRAD H. HOEPPNER

By Ralph L. Chappell

Attorney

Patented Dec. 19, 1950 2,534,264

UNITED STATES PATENT OFFICE 2,534,264

PULSE WIDTH DISCRIMINATOR

Conrad H. Hoeppner, Washington, D. C.

Application August 3, 1945, Serial No. 608,804

11 Claims. (Cl. 250—27)

(Granted under the act of March 3, 1883, as amended April 30, 1928; 370 O. G. 757)

This invention relates in general to electronic circuits having discriminatory response characteristics and in particular to an electronic circuit for pulse time duration discrimination.

In radio, radar, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a code pulsing system is to provide a receiver with a plurality of intervening circuits, each so constructed as to select and favor its particular type of electrical impulse. In this way a multiplicity of communication channels may be provided. The endowment of an electrical impulse with the chosen characteristic in the form in which it will be favored does not necessarily operate to prevent a variation in another characteristic which can be put to a useful purpose. Thus, a pulse which may be restricted as to its time duration so as to be favored by a pulse width discrimination circuit, can also be amplitude modulated so as to convey intelligence or provide a second means of discrimination.

It is an object of this invention to provide a circuit which is responsive only to potential variations or electrical impulses exceeding in duration a predetermined duration.

It is another object of this invention to provide a circuit which is responsive only to potential variations or electrical impulses of a duration less than a predetermined duration.

It is another object of this invention to provide a circuit which is responsive only to potential variations or electrical impulses of a certain time duration and which is unresponsive to potential variations or electrical impulses of all other time durations.

It is another object of this invention to provide a circuit which can be employed between a source of potential variations or electrical impulses and the receiver thereof as an intervening circuit which shields from such receiver all variations or pulses except those having a certain definite preselected time duration.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which.

Figure 1:
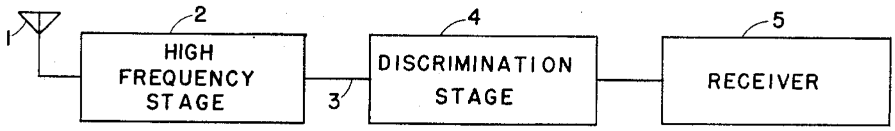
Fig. 1 is a simple block diagram of a pulse receiving system utilizing one embodiment of this invention.

Reference is now had in particular to Fig. 1 which is illustrative of a pulse receiving system wherein a discrimination circuit is employed to remove undesired video signals. Pulses or bursts of high frequency energy received by antenna 1, amplified and detected by high frequency stage 2 are impressed, in the form of the envelope of the high frequency pulses of energy, to input 3 of discrimination stage 4. Since the pulses of high frequency energy reaching antenna 1 may comprise not only a desired signal but also man-made and fortuitous interfering signals of a frequency which high frequency stage 2 will not reject, and since high frequency stage 2 may itself be a source of interfering signal, it is the function of discrimination stage 4 to shield from receiver 5 all pulses not having the time duration characteristics of the desired signal. The circuit of high frequency stage 2, not shown, is so constructed that only signals of negative polarity and steep leading and trailing edges are applied to input 3.

In general, the pulse width discrimination taught by this invention is accomplished by the production and amplification of pulses in synchronism with the trailing edges of only those incoming pulses which have the desired duration. A means is provided which inhibits the appearance at the output terminals of the produced and amplified trailing edge pulse if the duration of the incoming pulse is too short and a means is provided which inhibits the amplification of the trailing edge pulse and hence the output pulse appearance if the incoming pulse duration is too great. A time constant circuit, in the form commonly known as an integrator, is employed to provide a pulse having an amplitude which is a nearly linear function of the incoming pulse duration. When the amplitude of this continually increasing pulse reaches a value corresponding to the duration of a pulse to be favored, a differentiated pulse is produced and applied to an amplifier for the production of an output pulse. When the amplitude of the continually increasing pulse reaches a value corresponding to an overwidth incoming pulse, a biasing voltage is generated which prevents the amplification of the differentiated pulse and hence the appearance of an output signal.

Figure 2:
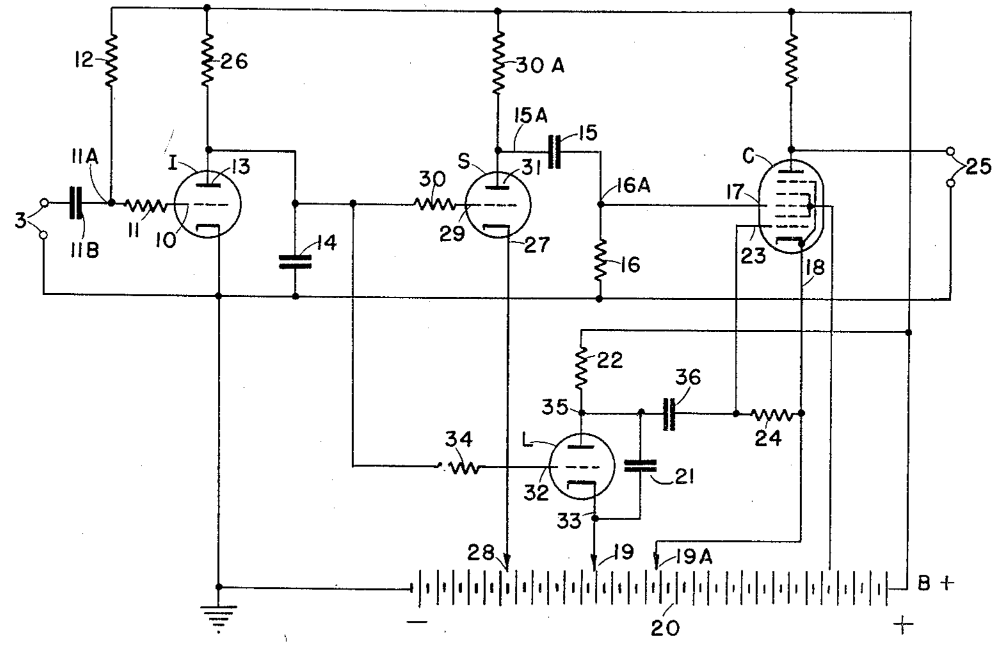
Fig. 2 is the circuit diagram of one embodiment of this invention.

In particular, tube C of Fig. 2, to which reference is now had, has its cathode 18 so connected to the positive potential at tap 19A on power supply 20 and its grid 17 so connected to ground potential through resistor 16 that tube C is non-conducting in the quiescent condition of the circuit. On the other hand, grid 23, although it is returned to cathode 18 through resistance 24 and therefore ordinarily permits conduction by tube C, does function to prevent plate current flow if there is applied to it a negative biasing signal. Thus, the potential difference between output terminals 25 falls below full B+ potential to produce an output pulse only in the presence of a positive unbiasing signal at grid 17 and in the absence of a negative biasing signal at grid 23. In a manner explained in the following paragraphs, the differentiating circuit comprising capacitor 15 and resistance 16 functions to impress a positive unbiasing signal on grid 17 only in response to an incoming pulse at input terminals 3 having a width (time duration) which exceeds a predetermined minimum width while the integrating circuit comprising capacitor 14 and resistance 26 associated with tube I functions to impress a negative biasing signal on grid 23 only in response to an incoming pulse at input terminals 3 having a width which exceeds a predetermined maximum width. Thus an incoming pulse too narrow fails to unbias tube C at grid 17, whereas a pulse too wide, while unbiasing tube C at grid 17, nullifies this action by biasing off grid 23. A pulse of the proper width applied at input 3 is detected at output 25 by the negative signal which accompanies the unnullified unbiasing of grid 17 of tube C.

It will be readily apparent to those skilled in the art that the arrangement of Fig. 2 comprising tube I and its immediately associated circuit components is an embodiment of the pulse redintegrator described in detail in my copending application, Serial No. 608,805, filed August 3, 1945. Further, it will be seen to be an arrangement in which the redintegrator produces, in response to input pulses of various durations sawtooth pulses whose amplitude varies substantially linearly with respect to the individual pulse durations. Thus the redintegrator combines three functions, clipping, limiting and integrating as will be described briefly below.

Grid 10 of tube I is so biased by connection to B+ potential through resistors 11 and 12 that tube I conducts strongly until a negative signal of amplitude sufficient to overcome the positive potential established at juncture 11A by grid current flow is applied to input terminals 3 via coupling capacitor 11B. Until a negative signal of the required amplitude is applied to input 3, the conducting condition of tube I remains substantially unchanged. Thus, with resistors 11 and 12 so chosen as to produce a potential at juncture 11A greater than the noise potential level reaching the discriminator from high frequency stage 2, tube I rejects random noise and weak interfering signals of whatever source. Received pulses arriving via antenna 1 not only exceed the noise level but exceed it sufficiently to drive the potential of grid 10 below cutoff and thereby place tube I in a non-conducting state for the duration of the pulses. In this manner the pulses are amplitude limited and the effect is the same as if a wavetrain consisting of a series of rectangular pulses of uniform amplitude and free of noise were applied to the discriminator.

In tracing first the positive pulse which unbiases grid 17 a predetermined interval after the leading edge of an incoming pulse, it will be seen that tube I is held normally conducting freely by the connection of its grid 10 to B+ through resistors 11 and 12. This free conduction by tube I provides a low potential at anode 13 and hence a negligible quiescent charge on capacitor 14. Incoming pulses at terminals 3 are effectively, as hereinbefore described, of negative polarity, have steep leading and trailing edges and have sufficient amplitude to drive grid 10 of tube I below cutoff potential and hold it there for the duration of any of such pulses. The tendency of anode 13 is, therefore, to rise abruptly at B+ potential coincident with the leading edge of an incoming pulse. This tendency is tempered, however, by the necessity of charging capacitor 14 through resistor 26 so that there appears at anode 13 a voltage which increases exponentially rather than abruptly. The values of capacitor 14 and resistor 26 have been chosen such that the exponential rise in anode 13 voltage is very nearly linear for the duration of any applied pulse. When tube I is again rendered conducting by the pulse trailing edge, capacitor 14 discharges rapidly through the low steady state resistance of tube I. In the arrangement shown, capacitor 14 and resistor 26 comprise an integrating circuit and this integrating circuit in combination with tube I forms a sawtooth generator. Thus, there appears at anode 13 in response to each applied pulse at input 3 a sawtooth pulse the amplitude of which is substantially a linear function of the width of the applied pulse.

Tube S, having sharp cutoff characteristics, is normally held nonconducting by the connection of its cathode 27 to the positive potential at tap 28 on power supply 20. When, however, the potential at grid 29 is carried sufficiently high by anode 13 of tube I to which it is connected through resistor 30, tube S conducts freely and an essentially rectangular negative pulse appears at anode 31. The duration of this rectangular negative pulse is determined by the interval of time during which the incoming pulse at input 3 persists after tube S has been rendered conducting since the potential of grid 29 will be held above cutoff for that interval.

The short time constant comprising capacitor 15 and resistor 16, which couples tube S to tube C, differentiates the rectangular negative pulse which appears at anode 31 and thereby impresses a sharp negative pulse (which only increases momentarily the bias already existing) and a sharp positive pulse on grid 17 of tube C in synchronism with the leading and trailing edges respectively of the rectangular pulse. The sharp positive pulse serves to remove the bias from grid 17 and to permit tube C to conduct insofar as that grid alone is concerned. This action is synchronous with the trailing edge of the incoming pulse at input 3 and can be initiated only by those of such incoming pulses as have a duration sufficient to cause tube S to conduct. This required duration may be decreased by decreasing the potential of cathode 27 and increased by increasing that potential. It may also be varied as required by proper choice of resistance 26 and capacitor 14 since it is this choice which fixes the rate of increase of potential at anode 13.

It will be seen that the circuit components just described comprise a pulse width discriminator which rejects all incoming pulses less than a predetermined width and favors all pulses over that width so as to produce output pulses in response thereto. Such an "underwidth discriminator" may have wide applications under circumstances in which it is necessary only to prevent the response of a component circuit to all pulses of less than a given duration. An example of this is provided by radio beacon art in which the beacon may be designed to respond only to long pulses and to remain quiescent in the presence of shorter pulses transmitted for purposes other than beacon interrogation. If a sharp negative pulse output is desired from the underwidth discriminator, it may be secured at juncture 16A of capacitor 15 and resistor 16 coincidental with the unbiasing of tube S by any pulse exceeding a predetermined width. If a positive pulse output is desired, it may also be secured at juncture 16A, this time coincidental with the trailing edge of any pulse exceeding a predetermined width. It follows, of course, that such negative or positive pulses may be amplified and inverted by impressing it upon a suitably biased amplifier (in the case of positive pulses, such an amplifier would be represented by tube C were its grid 23 returned directly to cathode).

Tube L, which has sharp cutoff characteristics and whose control grid 32 is connected to anode 13 of tube I through resistor 34, is so biased by connection of cathode 33 to the positive potential at tap 19 of power supply 20 that a higher potential at anode 13 and hence a wider pulse at input 3 is required to cause conduction than was required for tube S. When the applied pulse is of sufficient width to unbias tube L, its anode 35 tends to fall abruptly from B+ to substantially ground potential to form a rectangular negative pulse similar to the rectangular negative pulse generated at anode 31 of tube S. The trailing edges of the two similar pulses are synchronous since both are synchronous with the trailing edge of the applied pulse but the leading edge of the pulse formed by tube L is delayed in time from that formed by tube S by an amount determined by the tube characteristics and the difference in cathode biasing potentials.

The tendency of anode 35 to fall and rise abruptly to form a rectangular pulse is, however, tempered by the necessity of first discharging capacitor 21 through tube L and then charging it through resistance 22. The net effect is that, at the instant of time marked by the trailing edge of an applied pulse and hence by the unbiasing of grid 17 of tube C, capacitor 21 falls short of being fully charged to its quiescent condition. Since the variations at anode 35 are coupled to grid 23 of tube C by means of the long time constant circuit comprising capacitor 36 and resistance 24, tube C is therefore biased off by grid 23 during the short interval in which grid 17 undertakes to cause plate current flow if the incoming pulse is of sufficient duration to cause tube L to conduct.

There will be recognized here the action of an "overwidth discriminator" which, by itself, would accept all incoming pulses less than a predetermined width and reject all those over that width. Such an overwidth discriminator may be used to advantage in a radio beacon system in which the beacon is designed to respond only to short pulses and to remain quiescent in the presence of longer pulses transmitted for purposes other than beacon interrogation. In the circuit of Fig. 2 this simple overwidth discrimination may be had by removing tube S, resistors 30 and 30A and connecting lead 15A to the upper of terminals 3 rather than to anode 31 of tube S. These changes provide that a positive pulse is impressed on grid 17 of tube C coincidental with the trailing edge of each incoming pulse regardless of the duration. The "overwidth" action proceeds as described above to nullify the positive pulses on grid 17 which are derived from pulses over a certain predetermined duration.

Figure 3:
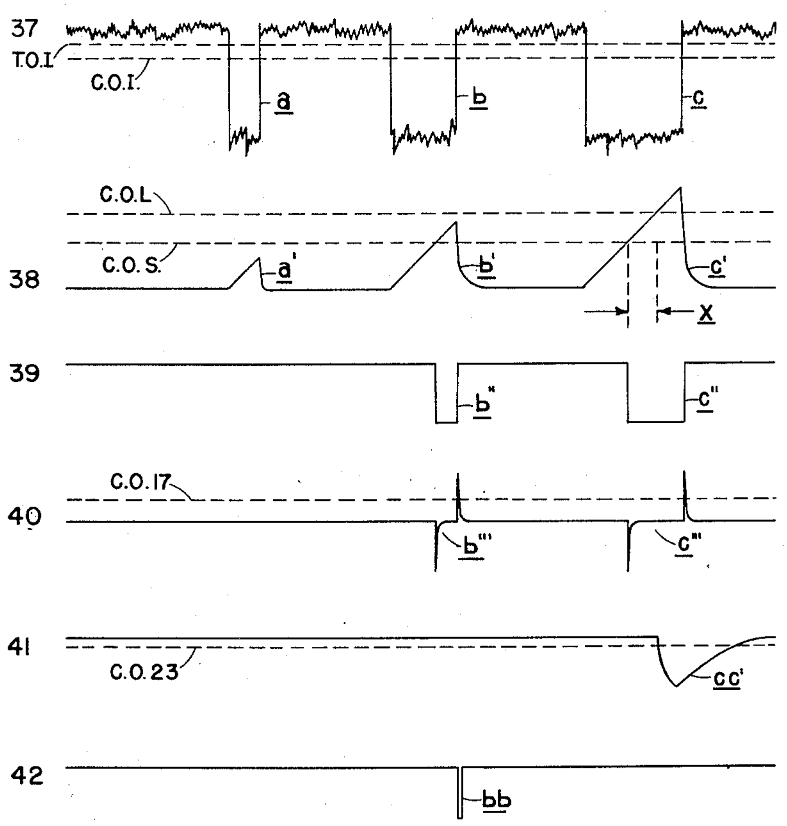
Fig. 3 is a series of waveforms useful in explaining the operation of the circuit of Fig. 2.

In Fig. 3 are shown several waveforms which illustrate the action of the circuit of Fig. 2. Waveform 37 is representative of a series of incoming pulses of which pulse *b* is of the width to be favored by the discriminator while pulse *a* is too narrow and pulse *c* too wide. Superposed on this waveform are potential levels T. O. I. and C. O. I. Level T. O. I. is representative of the amplitude which must be reached by a variation at input terminals 3 before the plate current flow in tube I is affected This is substantially the potential established at juncture 11A by the flow of grid current through resistors 11 and 12 and the grid to cathode resistance of the tube. Resistors 11 and 12 have been so chosen that level T. O. I. is above the noise level at the output of high frequency stage 2. Thus, the random variations in waveform 37 between pulses *a*, *b* and *c*, representing noise impulses, do not disturb the conducting condition of tube I and are rendered impotent in the manner described in my co-pending application supra.

Pulse *a* cuts off plate current flow in tube I as illustrated by the fact that ie exceeds the cutoff potential of tube I indicated by level C. O. I. and causes the generation of low amplitude sawtooth *a'* of waveform 38. The amplitude of this sawtooth pulse *a'* is insufficient to unbias either tube S or tube L, the cutoff potentials of which are indicated by levels C. O. S. and C. O. L. respectively, tube C remains biased, and no output signal appears at terminals 25. Pulse *b* likewise cuts off plate current flow in tube I and causes the generation of sawtooth pulse *b'* of waveform 38. The amplitude of pulse *b'* is sufficient to unbias tube S but fails to reach potential level C. O. L. to unbias tube L. Thus while tube L remains quiescent, tube S conducts to generate at its plate the rectangular negative pulse represented by pulse *b''* of waveform 39. Pulse *b''*, applied to the differentiating circuit comprising capacitor 15 and resistance 16, is resolved into the sharp positive and negative pulses at $b''$ of waveform 40. The sharp positive element of $b'''$ impressed upon grid 17 of tube C unbiases that tube as indicated by the fact that it exceeds cutoff level C. O. 17, causes plate current flow, and the appearance of output signal $bb$ of waveform 42 at output terminals 25. Tube I is again cutoff by pulse $c$ of waveform 37 and causes the generation of sawtooth pulse $c'$ of waveform 38. The amplitude of pulse $c'$ exceeds both level C. O. S. and level C. O. L. to unbias both tube S and tube L; tube S being unbiased interval $x$ before tube L. Tube S and its output differentiating circuit proceed as in the case of pulse $b$, to form the positive element of $c'''$ of waveform 40 which unbiases grid 17 of tube C. Tube L, when unbiased, discharges capacitor 21 to form pulse $cc'$ of waveform 41 which exceeds cutoff level C. O. 23 of grid 23 of tube C. The positive peak of $c'''$ is thereby rendered impotent and no output pulse appears at terminals 25. In the manner described, the pulse discriminator fails to produce and amplify a pulse synchronous with the trailing edge of an incoming pulse if that incoming pulse has a width which either falls short of or exceeds a predetermined width.

A considerable number of interesting and useful changes can be made in the embodiment shown without exceeding the spirit of the invention. For example, two of the triode elements of the circuit of Fig. 2 may be combined into a single dual triode envelope in order to conserve chassis space. Again, time constant circuits of inductance and resistance may be substituted for circuits of capacitance and resistance. Again, suitable circuit elements may be made adjustable so as to vary the limits of discrimination in a selectable manner.

It will be apparent that a time duration or pulse width discrimination circuit constructed in accordance with the teachings of this invention will have a wide variety of applications in radio, radar, television and other electronic fields whenever discrimination between voltage variations is desirable and the time durations of such variations can be used as the basis for such discrimination. It will also be apparent that a pulse width discrimination circuit constructed as taught by this invention may be used in combination with other circuits, also discriminatory in response, whose action is based on other characteristics of the input signal such as amplitude, polarity, or rate of change.

Since certain further changes may be made in the foregoing construction and different embodiments of the inventions may be made without departing from the scope thereof, it is intended that all matter shown in the accompanying drawings or set forth in the accompanying specification shall be interpreted as illustrative and not in a limting sense.

The invention described herein may be manufactured and used by or for the Government of of the United States of America for governmental purposes without the payment of any royalties thereon or therefor.

What is claimed is:

1. A method of pulse duration discrimination comprising, producing from incoming pulses pulses of continually increasing amplitude of the same duration as said incoming pulses, producing from said first produced pulses which exceed a first predetermined amplitude pulses the trailing edges of which are synchronous with the trailing edges of said incoming pulses, producing pulses from said first produced pulses which exceed a second predetermined amplitude greater than said first predetermined amplitude, and amplifying only those second said produced pulses which are non-synchronous with last said produced pulses.

2. A method of pulse duration discrimination comprising, producing from incoming pulses pulses of continually increasing positive amplitude of the same duration as said incoming pulses, producing negative pulses from only those of said first produced pulses exceeding a predetermined amplitude, and differentiating last said produced pulses so as to produce from the trailing edges thereof output pulses of positive polarity.

3. A pulse width discriminator comprising, a saw-tooth voltage generator operative responsive to incoming pulses to produce pulses the amplitude of which increases continually for the duration of said incoming pulses, means producing output pulses from only those of said pulses of continually increasing amplitude which exceed a first predetermined amplitude, and differentiating means producing output pulses from the leading edges of last said produced pulses.

4. A pulse width discriminator comprising, a saw-tooth voltage generator operative responsive to incoming pulses to produce pulses the amplitude of which increases continually for the duration of said incoming pulses, means producing output pulses from only those of said pulses of continually increasing amplitude which exceed a first predetermined amplitude, and differentiating means producing output pulses from the trailing edges of last said produced pulses.

5. A pulse width discriminator comprising, a saw-tooth voltage generator operative responsive to incoming pulses to produce pulses the amplitude of which increases continually over the duration of said incoming pulses, means receiving the output pulses from said saw-tooth generator, said means being operative in response to said output pulses which exceed a first predetermined amplitude to produce pulses synchronous with the trailing edges of said incoming pulses, amplifying means connected to the output of said means, and pulse generating means cooperatively coupling said amplifying means and said saw-tooth generator responsive to the output pulses from said saw-tooth generator which exceed a second predetermined amplitude for rendering said amplifying means inoperative.

6. A pulse width discriminator comprising, a first pulse forming circuit responsive to incoming pulses to produce pulses the amplitude of which increases continually over the duration of the incoming pulses, a second pulse forming circuit responsive to those pulses of continually increasing amplitude which exceed a first predetermined amplitude to produce output pulses synchronous with the trailing edges of the incoming pulses, amplifying means responding to and amplifying said output pulses, and means cooperatively coupling said first pulse forming circuit to said amplifying means, said last named means operative responsive to those pulses of continually increasing amplitude which exceed a second predetermined amplitude, higher than the first, to render said amplifying means unresponsive to said output pulses.

7. A pulse width discriminator comprising, a first pulse forming circuit responsive to incoming pulses to produce pulses the amplitude of which increases continually over the duration of the incoming pulses, a second pulse forming circuit responsive to those pulses of continually increasing amplitude which exceed a first predetermined amplitude to produce output pulses synchronous with the trailing edges of the incoming pulses, amplifying means responding to and amplifying said output pulses, and a third pulse forming circuit cooperatively coupling said first pulse forming circuit to said amplifying means, said last named pulse forming circuit operative responsive to those pulses of continually increasing amplitude which exceed a second predetermined amplitude, higher than the first, to render said amplifying means unresponsive to said output pulses.

8. A pulse width discriminator comprising, a first pulse forming circuit responsive to incoming pulses to produce pulses, the amplitude of which increases continually over the duration of the incoming pulses, a second pulse forming circuit responsive to those pulses of continually increasing amplitude which exceed a first predetermined amplitude to produce output pulses synchronous with the trailing edges of the incoming pulses, amplifying means responding to and amplifying said output pulses, a threshold limiter circuit cooperatively coupling said first pulse forming circuit to said amplifying means, said last named circuit operative responsive to those pulses of continually increasing amplitude which exceed a second predetermined amplitude, higher than the first, to render said amplifying means unresponsive to said output pulses.

9. A pulse width discriminator comprising, means producing output pulses in response to those incoming pulses which are greater in duration than a predetermined duration, said means including a saw-tooth generator circuit responsive to incoming pulses for producing pulses the amplitude of which increases over the duration of the incoming pulse, amplifying means responding to and amplifying said output pulses, and a control circuit coupling said saw-tooth generator to said amplifying means operative responsive to those pulses of continually increasing amplitude which exceed a second predetermined amplitude, higher than the first, to render said amplifying means unresponsive to said output pulses.

10. A system for segregating pulses of predetermined time duration from a group of pulses which may be of lesser and greater time duration, said pulses being of uniform amplitude, said system comprising means for generating a voltage whose amplitude is proportional to the time duration of a pulse, means for feeding the output of said generating means as inputs to two paths, one of said paths having means for suppressing waves of less than a predetermined amplitude and corresponding to said pulse of predetermined time duration, means for feeding the output of said suppressing circuit to the other path, said other path having means therein for combining the two inputs thereto to provide a final output having waves therein corresponding to said pulses of predetermined time duration, said generating means including a vacuum tube having at least a cathode, control grid and anode, said anode being connected to a source of B+ potential, means for impressing said voltage pulses between said control grid and cathode, and an output circuit including a resistance and capacitance connected to said anode whereby the output voltage developed across said capacitance is a substantially linear saw-tooth wave for each input pulse, the amplitude of each output wave being proportional to the time duration of its corresponding input pulse.

11. A system for segregating pulses of predetermined time duration from a group of pulses which may be of lesser and greater time duration, said system comprising a wave generator fed by said pulses for developing waves whose amplitude is dependent upon the time duration of said pulses, a first circuit fed by the output of said generator for suppressing waves having an amplitude corresponding to said pulses of lesser time duration, a second circuit fed from said generator for suppressing waves having an amplitude corresponding to said predetermined time duration, and a third circuit differentially controlled by the outputs of said first and second circuits for deriving waves corresponding to said pulses of predetermined time duration.

CONRAD H. HOEPPNER.

REFERENCES CITED

The following references are of record in the file of this patent:

UNITED STATES PATENTS

| Number | Name | Date |
|---|---|---|
| 2,211,942 | White | Aug. 20, 1940 |
| 2,266,401 | Reeves | Dec. 16, 1941 |
| 2,359,447 | Seeley | Oct. 3, 1944 |

FOREIGN PATENTS

| Number | Country | Date |
|---|---|---|
| 528,192 | Great Britain | Oct. 24, 1940 |